March 23, 1937.  F. W. CUTLER ET AL  2,074,740
FRUIT DRIER
Filed March 12, 1934   3 Sheets-Sheet 1

INVENTORS.
Frank W. Cutler.
Asa. B. Cutler.
BY Philip A. Minnis
ATTORNEY.

March 23, 1937.   F. W. CUTLER ET AL   2,074,740

FRUIT DRIER

Filed March 12, 1934   3 Sheets-Sheet 3

INVENTORS.
Frank W. Cutler.
Asa B. Cutler.
BY Philip A. Minnis
ATTORNEY.

Patented Mar. 23, 1937

2,074,740

UNITED STATES PATENT OFFICE 2,074,740

FRUIT DRIER

Frank W. Cutler and Asa B. Cutler, Portland, Oreg., assignors to Food Machinery Corporation, San Jose, Calif., a corporation of Delaware Application March 12, 1934, Serial No. 715,057

3 Claims. (Cl. 34—12)

This invention relates to certain new and useful improvements in fruit drying apparatus such as may be used in the fruit packing industry to dry washed fruit preparatory to packing it for shipment, and has for its primary object the provision of a fruit drier which is unusually compact in construction and which is capable of drying fruit more rapidly and effectively than heretofore possible.

In the construction of apparatus embodying the principles of our invention we employ a fruit treating runway or conveyer, made up of a plurality of absorbent surfaced supporting rolls mounted for rotation about fixed axes and arranged in side by side relation to form a support for the fruit therebetween, and we prefer to arrange the rolls transversely of the flow of fruit thereover and to so construct and arrange them that they are normally incapable of advancing the fruit by their tractive effect alone, except as the fruit is urged by the application of force other than such tractive effect. The absorptive qualities of the rolls may be maintained by the provision of suitable means for continuously expressing moisture therefrom, preferably in the form of wringer rollers disposed beneath the conveyer rolls and in operative engagement therewith.

Among the several more specific objects of the invention is that of increasing the drying and polishing efficiency of the rolls by reciprocating certain of them transversely of the conveyer at a sufficient rate to alter the rotative axes of the pieces of fruit as they pass over the conveyer, and further, to provide suitable mountings for the wringer rollers whereby those wringer rollers engaging the reciprocating rolls may reciprocate in unison therewith.

Still further objects are to augment the drying action of the conveyer rolls by blowing moisture bodily from the fruit by means of air discharging devices disposed to discharge air upwardly against conveyed fruit and positioned between certain of the rolls in close relation to the fruit whereby the full force of the air blast is utilized, and less power required to produce an effective blast; and further, to provide the conveyer with a preliminary drying section over which the fruit may pass for removal of excess moisture prior to passing over the air discharge.

The above recited objects and advantages, together with numerous others in addition thereto, will be best appreciated and most fully understood by reference to the accompanying drawings, which illustrate a preferred form of fruit drying apparatus embodying the principles of our invention. In the drawings.

Figure 1:
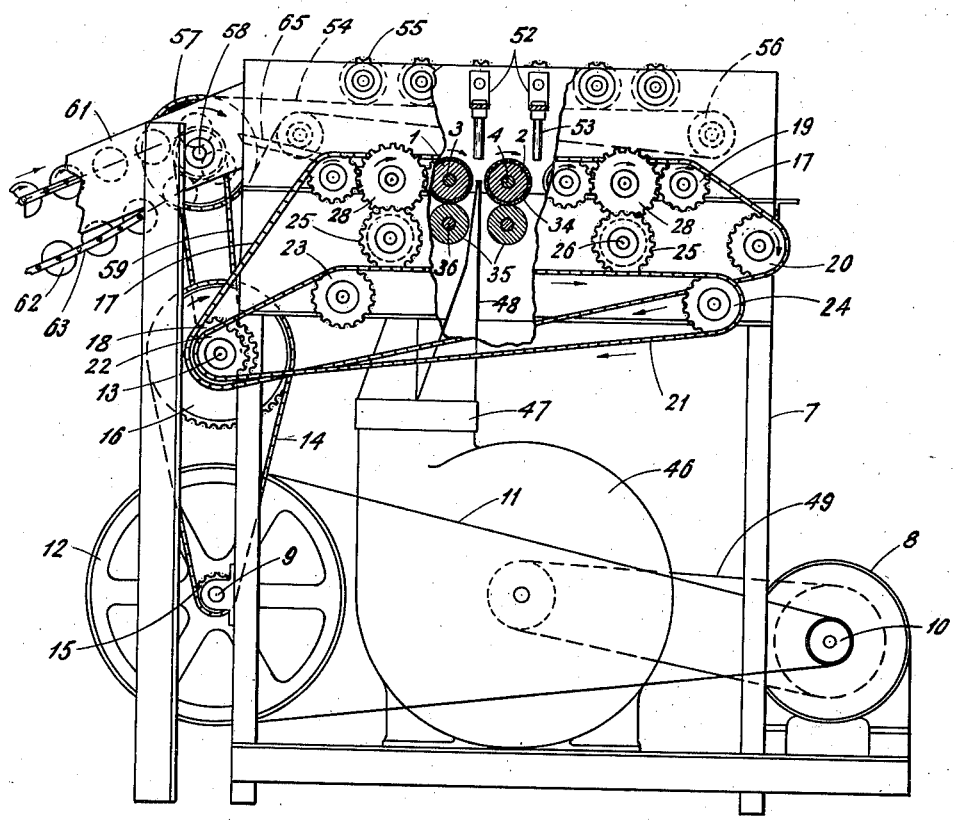
Figure 1 is a side elevation of the apparatus.

In the construction illustrated, the fruit to be dried is passed over a conveyer made up of a series of alternately arranged absorbent surfaced conveyer rolls 1 and 2, which are disposed transversely of the path of fruit passing thereover and in adjacent parallel relation so as to form a supporting runway for fruit undergoing treatment, the rolls 1 being mounted for rotation in fixed position, while the alternately arranged rolls 2 are mounted for combined rotation and endwise reciprocation by mechanism shortly to be described. The non-reciprocating rolls 1 and the reciprocating rolls 2 are provided with drive shafts 3 and 4 respectively, which are rotatably journalled in bearings 5 carried by the longitudinal side rails 6 of a suitable framework, which latter may include legs 7 for supporting the same.

As may be seen, the reciprocating rolls 2 are somewhat longer than the non-reciprocating rolls 1, the extra length being provided to allow for reciprocation while providing for an effective width of runway substantially equal to the length of the non-reciprocating rolls.

The conveyer rolls are all driven in a common direction by means of an electric motor 8 which drives a counter shaft 9 through the medium of the motor pulley 10, belt 11, and a pulley 12 secured to the counter shaft. A jack shaft 13 is driven from the counter shaft 9 by means of a chain 14 trained around sprockets 15 and 16, and the non-reciprocating rolls 1 are in turn driven from the jack shaft 13 by means of a chain 17 passing around a sprocket 18 on the jack shaft and engaging sprockets 19 secured to the outer ends of the roll shafts. An idler sprocket 20 may be provided for tightening the chain 17.

The alternate reciprocating rolls 2 are driven by means of a chain 21 passing around a jack shaft sprocket 22 and supported by idler sprockets 23 and 24 to engage sprockets 25 carried on the outer ends of stub shafts 26 rotatably journalled in bearings 27 secured to the frame. The roll shafts 4 are provided with gears 28 in mesh with wide faced pinions 29 on the stub shafts 26 which permit sliding movement of the gears across the pinion faces without disengagement.

During operation of the conveyer endwise reciprocation is imparted to the rolls 2 by means of cams 30 secured to the outer ends of their drive shafts to one side of the machine. The faces of the cams 30 are provided with cam grooves 31 into which project cam rollers 32 secured in fixed position by means of supporting brackets 33 secured to a portion of the framework of the machine. It will be seen that by reason of the engagement of the cam rollers with the cam grooves, endwise reciprocation of the conveyer rolls 2 will be effected as they rotate.

The pitch of the cam grooves is selected to effect a sufficiently rapid reciprocation of the conveyer rolls 2 to effectively turn the pieces of fruit about as they rest upon the rotating rolls, thereby changing their rotative axes and insuring that all parts of their surfaces are presented to the action of the drying medium employed. It will be understood that the tractive effect of the conveyer rolls upon the fruit supported thereby imparts a rapid forward rotation to the pieces of fruit, so that in order to turn the fruit about, the turning effect of the reciprocating rolls must be sufficient to overcome the forward rotative momentum of the fruit.

We have found that to effectively turn the fruit the lateral surface speed of the reciprocating rolls should be approximately .4 or more times their rotative speeds. For example, we may use conveyer rolls of three inch diameter and driven at 95 R. P. M., in which case we find it desirable to reciprocate the rolls at a rate of from 180 to 200 two inch strokes per minute. In practice we prefer to reciprocate the rolls at about 190 strokes per minute for the best average results.

It will be understood that the above specific examples are illustrative only, and may be departed from somewhat depending upon operating conditions as, for example, the average size and general shape of fruit undergoing treatment. It is also contemplated that instead of reciprocating only every other roll, they may all be reciprocated if desired, each roll being reciprocated in a direction opposite to the adjacent roll. In this event, since the turning effect on the fruit is doubled, the speed of reciprocation relative to the rotative speeds need be but half of that required where every other roll only is reciprocated.

As the fruit passes across the conveyer rolls, moisture is removed from it by means of absorbent coverings 34 on the rolls, and for this purpose we prefer to use an absorbent fabric having a piled surface on its outer side, such as velour for example. By the use of a fabric covering of this nature a combined brushing and absorbing action is obtained, as the moisture is not only effectively absorbed from the fruit by the absorbent fabric, but the piling also imparts a desirable polish to the fruit, thereby enhancing its appearance. Moreover, experience indicates that the piling also assists in the transfer of moisture from the fruit to the fabric, and thus increases the effectiveness of the fabric and the rapidity of absorption.

Figure 3:
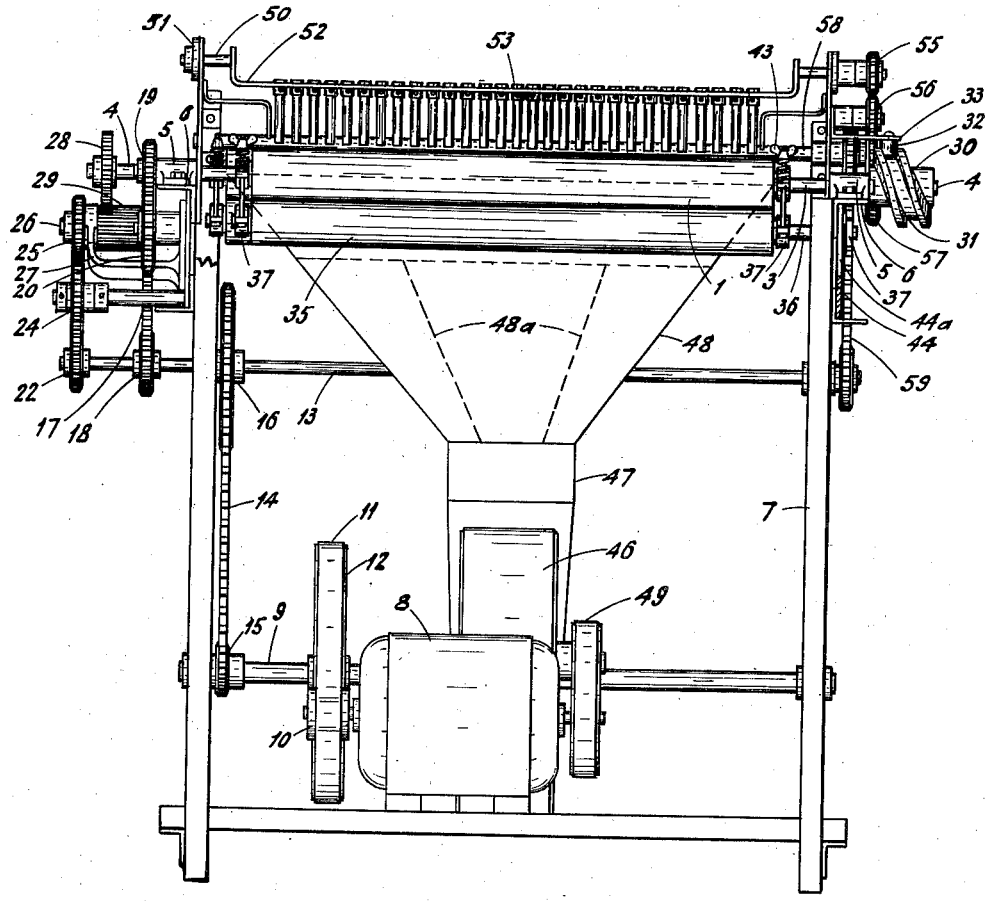
Figure 3 is an end elevation, partly in section of the apparatus as viewed from the right of Figure 1.
Figure 4:
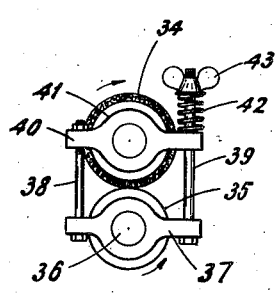
Figure 4 is a detail of one of the wringer roller mountings.

The absorbent qualities of the coverings are maintained by means of wringer rollers 35 disposed in operative engagement with the conveyer rolls to continuously express moisture therefrom. The wringer rollers are supported in operative position by means of shafts 36 which are journalled in bearings 37 suspended from the conveyer roll drive shafts by means of rods 38 and 39 secured at their upper ends to ears 40 provided on bearings 41 loosely journalled on the conveyer roll drive shafts. By suspending the wringer rollers in this manner from the conveyer roll drive shafts it will be seen that the wringer rollers are free to reciprocate in unison with the reciprocating conveyer rolls, thereby avoiding excessive wear on the absorbent coverings of the reciprocating rolls which would necessarily occur if the wringer rollers were not free to reciprocate therewith. The supporting rods 39 are extended above the ears 40, as best seen in Figures 3 and 4, and surrounded by a coil spring 42 which is compressed between the ear and a wing nut 43 threaded on the upper end of the rod. This construction permits adjustment of the pressure of the wringer rollers against the conveyer rolls by adjusting the wing nuts.

Rotation of the wringer rollers about the axes of the conveyer rolls is prevented by extending the shafts 36 to one side of the machine where they are journalled in bearings 37. The bearings 37 are slidably mounted for vertical movement in slots or guideways 44a cut in side walls 44 extending longitudinally of the frame so as to allow for vertical adjustment of the wringer rollers to alter their pressure against the conveyer rolls.

Figure 2:
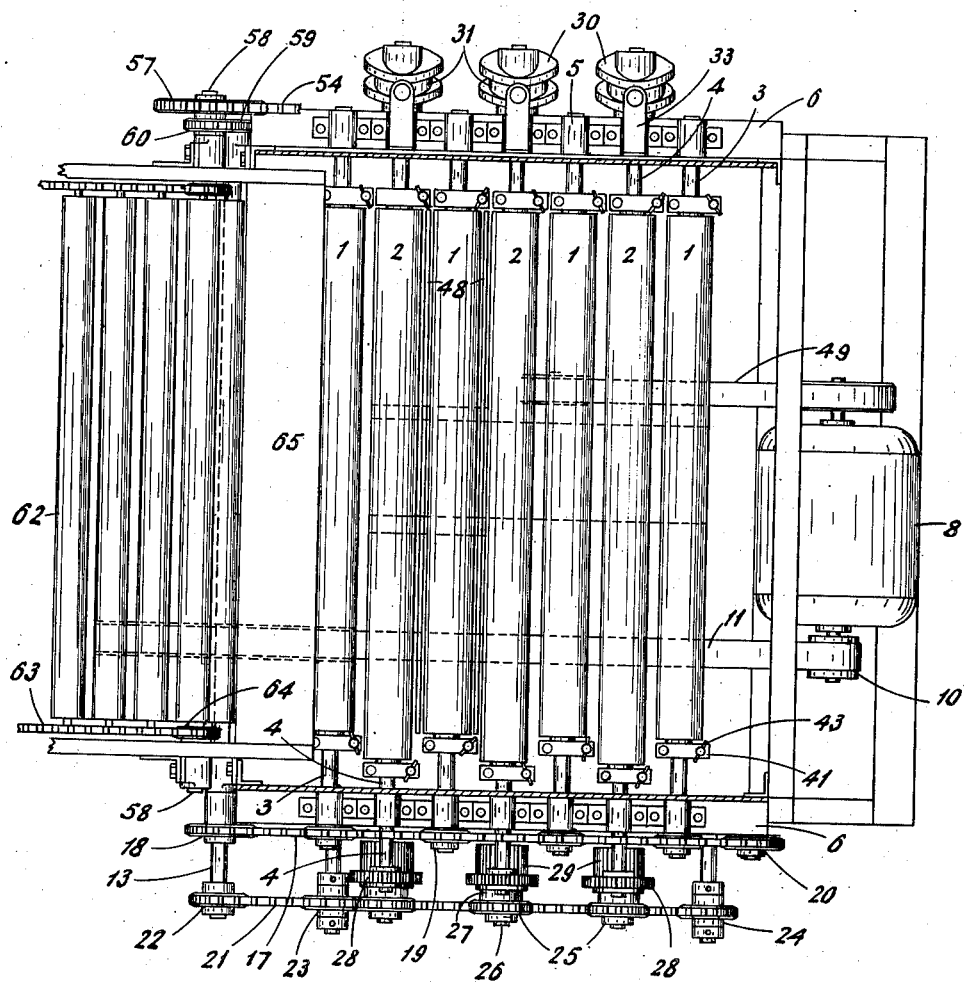
Figure 2 is a plan view, but with the progressor mechanism omitted to better illustrate certain details of construction.

While the absorbent coverings of the conveyer rolls effectively dry the exposed surfaces of the fruit passing over them, they are not effective in removing moisture from any cavities or crevices in the fruit such as are usually present at the stem and calyx ends, and in order to dry these portions of the fruit we provide means for blowing the moisture bodily from any such depressions in the fruit. A fan or blower 46 is arranged to discharge air into a conduit 47, which is provided with upwardly directed nozzles or mouth portions 48 disposed to discharge air against the underneath sides of fruit resting in the valleys between certain of the rolls. In order to utilize the full force of the air blast it is desirable to arrange the nozzles as close to the fruit as possible, and for this reason the nozzles are projected in between the rolls into close proximity to the undersurface of the fruit. As the conveyer rolls do not travel, but rotate on fixed axes, this construction does not interfere with the operation of the conveyer and less power is required to produce an effective air blast than if the nozzles were to be placed above the conveyer where they would necessarily have to be disposed at a sufficient height to clear the largest pieces of fruit in order that they might pass freely over the conveyer. The nozzles 48 are preferably sufficiently wide mouthed to extend across the full width of the conveyer, as best seen in Figures 2 and 3, so as to insure that every piece of fruit passing over the conveyer is subjected to the force of the air blast. Baffles or partitions 48a may be provided within the nozzles if desired in order to equalize distribution of the air across the width of the nozzles. The fan 46 may be driven from the motor 8 by means of a belt 49 so as to discharge air from the nozzles 48 under sufficient velocity to blow moisture bodily out of the fruit cavities so that it may be absorbed by the conveyer rolls.

Although only two nozzles are provided in the apparatus illustrated, it will be understood that as many may be provided as desired. We prefer, however, to so arrange the nozzles that the fruit passes over a portion of the conveyer prior to being subjected to the air blast. In the illustrated embodiment the first two conveyer rolls provide this preliminary drying section where the excess moisture is removed by absorption prior to the application of the air blast. By providing for such preliminary removal of excess moisture the air jets do not blow as much liquid into the air as would otherwise be the case, and the drying efficiency of the air jets is likewise increased.

The drying and wiping effect of the conveyer rolls is most effectively utilized if more or less force is required to push the fruit across the conveyer rolls, whereby the pressure of the fruit against the rolls is increased beyond the pressure due to its weight alone, and for this reason we so proportion and drive the conveyer rolls that the fruit may not normally be advanced thereacross by the tractive effect of the rolls alone, but may be advanced only by the application of additional force. This is accomplished in the apparatus illustrated by providing rolls of such size, relative to the diameter of fruit being conveyed, that fruit deposited in the valleys between the rolls will remain there until urged forwardly by the application of force other than the tractive effect of the rolls. If desired, the conveyer may be inclined upwardly towards its discharge end so as to increase the force required to advance the fruit.

The advancement of the fruit across the conveyer rolls may be accomplished by the displacement method in which the force required to advance the fruit is supplied by the urge of additional fruit being delivered to the conveyer, or a progressor mechanism may be used if desired. We prefer to advance the fruit by means of a progressor mechanism of such character as will advance the fruit in uniformly separated rows in a timed step by step movement from valley to valley across the rolls, thereby insuring uniform treatment with a minimum amount of frictional contact between the pieces of fruit, which might interfere with the turning action of the reciprocating rolls, as well as bruising or otherwise injuring the fruit by reason of excessive contact between the pieces.

Figure 5:
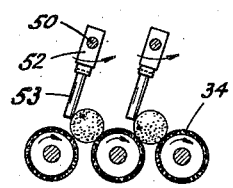
Figure 5 illustrates the manner in which the fruit is progressed over the conveyer rolls.

A suitable form of progressor mechanism for the purpose may include a series of progressor shafts 50 disposed above and transversely of the conveyer and rotatably journalled in bearings 51 supported by a portion of the framework. The shafts 50 extend immediately above and parallel to the valleys between the conveyer rolls and are provided with offset or crank-like portions 52 to which are attached a series of resilient pusher or progressor fingers 53 of sufficient length to engage and advance fruit over the rolls upon rotation of the progressor shafts. See Figure 5. The function of the crank-like portions of the progressor shafts is to permit the outer ends of the pusher fingers to pass through the axis of rotation of the adjacent progressor shafts, thus making it possible to space the shafts sufficiently close to each other so they may overlie the valleys between the conveyer rolls, and to arrange them at a sufficient elevation to clear the largest pieces of fruit, while at the same time permitting the use of progressor fingers of adequate length to properly engage and advance the smallest pieces of fruit. It will be seen that these several conditions could not be satisfied if the progressor shafts were made straight, since if straight shafts were to be arranged at the elevation required to permit the passage of the largest pieces of fruit over the conveyer the adjacent shafts would interfere with rotation of the progressor fingers, or, if the progressor fingers were shortened so as to clear adjacent shafts their shortnesss would prevent them from properly engaging the smallest pieces of fruit.

The progressor shafts may be driven in timed relation so as to rotate the progressor fingers in uniformly positioned relation by means of a chain 54 engaging with sprockets 55 secured to the outer ends of the progressor shafts to one side of the machine. The chain 54 is supported by a pair of sprockets 56 and 57, the latter being secured to the transverse shaft 48 which is driven from the jackshaft 13 by means of a chain 59 passing around a sprocket secured to the jack shaft and sprocket 60 secured to the shaft 58.

The fruit is delivered to the drier rolls in rows by means of an endless conveyer 61 of conventional type including a series of spaced rollers 62 transversely supported between spaced side chains 63 which pass around and are driven by sprockets 64 secured to the shaft 58.

The proper operation of the apparatus requires that the fruit be delivered to the drying rolls in such timed relation to the operation of the progressor mechanism that a single row of fruit is delivered by the endless conveyer to the drying rolls for each cycle of operation of the progressor fingers 53, and to this end the driving ratio between the sprockets 57 and 55 is such that during each revolution of the progressor shafts 50 the endless conveyer is moved forwardly just the proper distance to discharge a single row of fruit onto the drying rolls. The operative relation between the endless conveyer and the progressor mechanism may also be such that a row of fruit is delivered to the drying rolls shortly after the progressor fingers have started on their upward travel and left the valleys unobstructed.

The operation of the apparatus described may be described as follows: The fruit to be dried is deposited upon the rolls 62 of the endless conveyer 61 and is conveyed toward the drier in spaced rows resting between the rolls. During each complete cycle of the progressor fingers 53 the conveyer 61 is advanced the proper distance to discharge a single row of fruit across the delivery ramp 65 and into the valley between the initial pair of drying rolls 1 and 2, where it remains until the progressor fingers descend behind it and advance it into the next succeeding valley.

During the period the fruit remains in the first valley it is rapidly rotated by the drier rolls, all of which are rotating in a common forward direction, and is subjected to the combined drying and polishing action of the absorbent coverings on the rolls. By reason of the inertia of the fruit, its speed of rotation will lag somewhat behind the speed of the drying rolls so that the faces of the rolls are wiped across the surface of the fruit, so that the piling of the absorbent fabric exerts a polishing action as well as assisting in the removal of moisture by mechanically dispersing it. The absorbent qualities of the fabric coverings on the rolls is continuously maintained by the engagement therewith of the wringer rollers, which express the moisture from the fabric as it is absorbed.

By reason of the continuous reciprocation of one of the drying rolls upon which the fruit is supported, the fruit is not permitted to rotate continuously upon a single axis, but is continuously twisted about so as to alter its rotative axis, thereby insuring that the entire surface of the fruit will be acted upon by the roll surfaces, and the reciprocation of the supporting roll also exerts an additional wiping effect on the fruit to increase the drying and polishing action.

The fruit remains in the valley between the first two drying rolls where it is continuously subjected to the combined drying and polishing action of the rolls until the progressor fingers descend behind it and advance it to the next valley. As the progressor fingers engage the fruit they retard its rotation slightly and also press it against the forward roll, thereby momentarily increasing the wiping action of the forward roll during the transfer of fruit from one valley to the next.

When the fruit is transferred into the second valley it is again subjected to the same drying and polishing action as it was in the first valley, and in addition is also subjected to the action of a blast of air issuing upwardly from the nozzle 48 under sufficient velocity to blow moisture bodily out of any crevices or cavities in the fruit which cannot be reached by the absorbent coverings on the rollers. The twisting of the fruit by the reciprocating roll not only results in presenting the entire surface of the fruit to the action of the absorbent fabric, but also insures that no part of the fruit will escape the full force of the air blast. The amount of moisture blown upwardly from the fruit by the air blast will be relatively small, since the majority of the excess moisture has been removed from the fruit by the preliminary section of the drier formed by the initial pair of rolls. Of that part of the moisture which may fall back, a portion will inevitably fall directly upon the drying rolls and so be immediately absorbed, while the most of the remainder will fall upon those surfaces of the fruit exposed to the action of the absorbent fabric; but in order to provide for the removal of any moisture which may fall back into the fruit cavities, a second nozzle is provided beneath the third valley which again blows moisture from the fruit when it is advanced into that valley. By the time the fruit reaches the third valley only a very small amount of excess moisture, if any, is left adhering to the fruit, and this is effectively removed by the combined action of the drying rolls and air blast, the remaining rolls being provided to remove any remaining dampness on the fruit.

As the progressor fingers advance the first row of fruit out of the valley formed between the first and second drying rolls, the endless conveyer 61 is operated to discharge another row of fruit into the valley, and so on, the progressor mechanism advancing the fruit through the machine in uniformly separated rows in a step by step movement, whereby all of the fruit is uniformly treated, and crowding of the fruit, which might result in some of it interfering with the free and uniform rotation of adjacent pieces, is effectually prevented.

Having fully described the invention, it will be understood that although the embodiment illustrated represents a practical construction which has been successfully operated in commercial practice, various modifications and variations may be restored to, as, for example, all of the rolls may be reciprocated if desired instead of only every other one as shown; additional nozzles may be arranged under any number of valleys as may seem desirable; the number of drying rolls, both in the preliminary section over which the fruit passes prior to being subjected to the air blast, and in the succeeding portion of the drier, may be varied as circumstances may require, and various other modifications and alterations, which will be apparent to those skilled in the art, may be resorted to, all without departing from the spirit of the invention as defined in the appended claims.

What we claim as new and desire to protect by Letters Patent is:

1. In a fruit drying apparatus, a series of absorbent surfaced fruit supporting rolls arranged in adjacent parallel relation transversely of the path of fruit passing thereover, and mounted for rotation about fixed axes, means for rotating said rolls in a common direction, means for imparting endwise reciprocation to certain of said rolls to change the rotative axes of pieces of fruit passing thereover, a wringer roller disposed beneath each fruit supporting roll and in operative engagement therewith to express moisture therefrom, means for supporting those wringer rollers which engage the reciprocating fruit supporting rolls for reciprocating in unison therewith, and means for restraining movement of the wringer rollers about the axes of the fruit supporting rolls.

2. In a fruit drying apparatus, a series of absorbent surfaced fruit supporting rolls arranged in adjacent parallel relation transversely of the path of fruit passing thereover, and mounted for rotation about fixed axes, drive shafts for said rolls, means for driving said rolls in a common direction, means for imparting endwise reciprocation to certain of said rolls to change the rotative axes of pieces of fruit passing thereover, wringer rollers disposed beneath said fruit supporting rolls, means for supporting said wringer rollers in operative engagement with the fruit supporting rolls to express moisture therefrom, the supporting means for those wringer rollers which engage the reciprocating fruit supporting rolls being suspended from the drive shafts of such fruit supporting rolls for reciprocation in unison therewith, and means for restraining movement of the wringer rollers about the axes of the fruit supporting rolls.

3. A fruit supporting and drying unit for fruit drying machines comprising a fruit supporting roll having an absorbent surface, a drive shaft therefor, a wringer roller disposed beneath said supporting roll, supporting members suspended from said drive shaft for supporting said wringer roller, yieldable means associated with said wringer roller supporting members for urging the wringer roller into operative engagement with said fruit supporting roll, and means for adjusting the yieldability of said yieldable means.

FRANK W. CUTLER.
ASA B. CUTLER.